April 23, 1940.　　　H. L. KRAEFT　　　2,197,936
BICYCLE STAND MECHANISM
Filed July 21, 1938
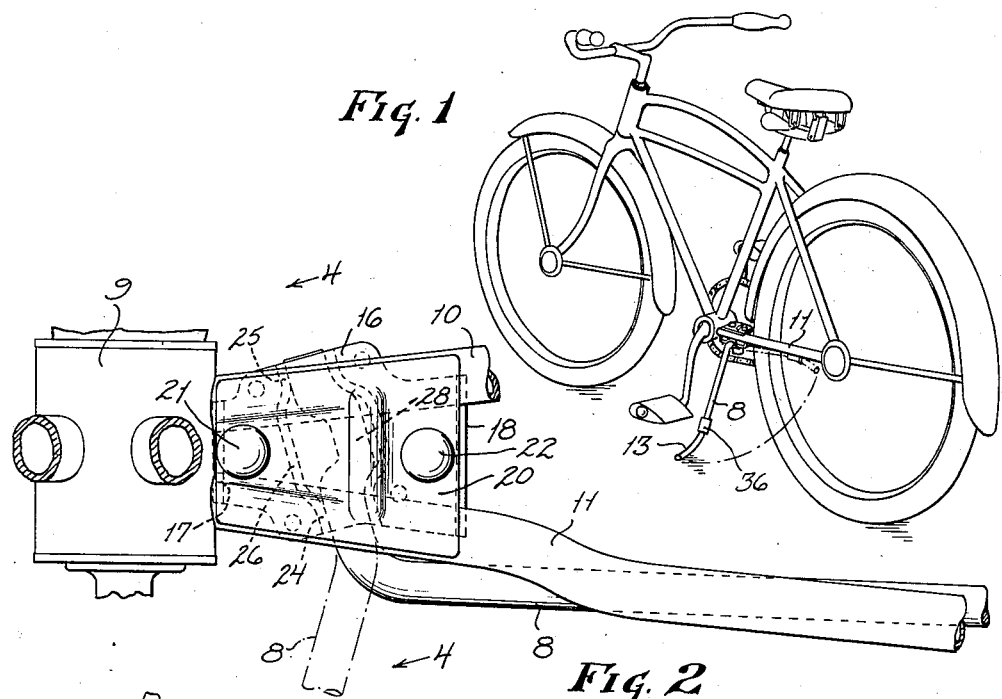
Fig. 1
Fig. 2
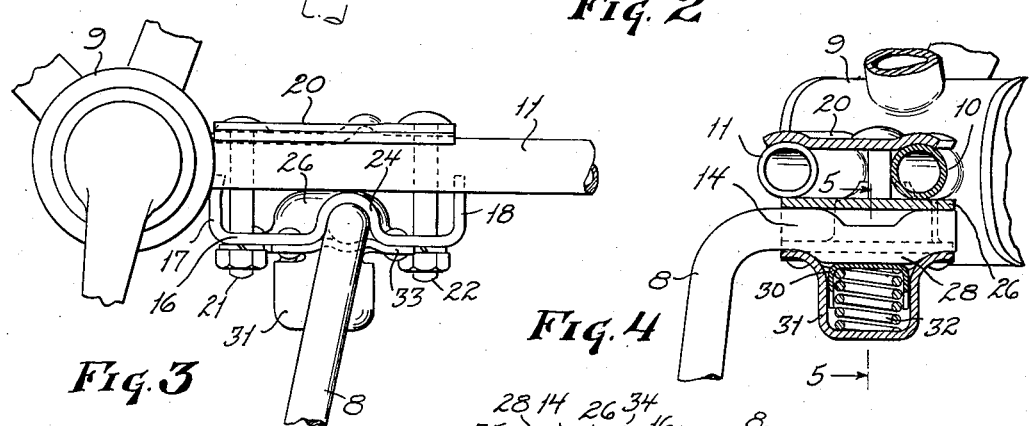
Fig. 3
Fig. 4
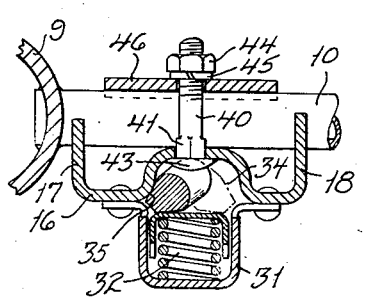
Fig. 7
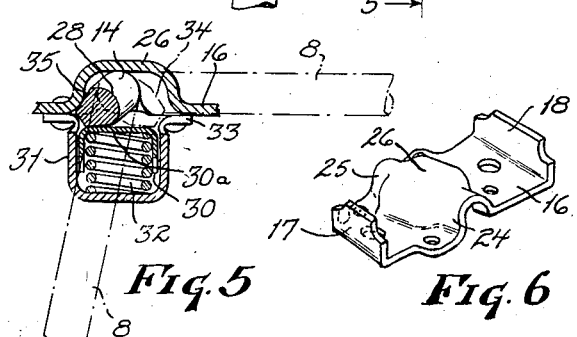
Fig. 5　　Fig. 6
INVENTOR.
HERMAN L. KRAEFT
BY Bates, Golrick & Teare
ATTORNEYS Patented Apr. 23, 1940

2,197,936

UNITED STATES PATENT OFFICE 2,197,936

BICYCLE STAND MECHANISM

Herman L. Kraeft, Cleveland Heights, Ohio, assignor to Murray-Ohio Manufacturing Company, Cleveland, Ohio, a corporation of Ohio Application July 21, 1938, Serial No. 220,472

2 Claims. (Cl. 280—301)

This invention relates to stand mechanisms for bicycles, and more specifically to bicycle stand mechanisms of the side-swing type.

An object of the present invention is to provide a sturdy bicycle stand support mechanism, which is simple in operation and adaptable for attachment to various bicycle frame structures.

Another object of the present invention is the provision of a bicycle stand of the side swing type having a bicycle frame attaching means, and associated positioning mechanism adapted to act upon the bicycle stand proper to hold the stand in bicycle-supporting position or in an inoperative position in a positive manner.

A further object is to provide a side kick bicycle stand mechanism which is simple in construction, can be compactly made to occupy a minimum of space and in which the operating parts can be completely housed.

Other objects of my invention will become apparent from the following description relating to the accompanying drawing showing preferred forms thereof. The essential characteristics are summarized in the claims.

Referring to the drawing, Fig. 1 is a perspective view of a bicycle equipped with my bicycle stand mechanism showing the mechanism adjusted to bicycle-supporting position; Fig. 2 is a fragmentary plan view of the lower rear fork members of the bicycle frame and the bicycle stand mechanism attached thereto; Fig. 3 is a fragmentary side elevation showing the attaching means which affords ready affixing of the bicycle stand mechanism to the lower rear fork members of the bicycle frame adjacent the crank hanger housing of the bicycle frame; Fig. 4 is a transverse cross-sectional elevation of the stand-attaching means, taken substantially along the line 4—4 in Fig. 2; Fig. 5 is a cross-sectional view of part of the stand mechanism taken substantially along the line 5—5 of Fig. 4; Fig. 6 is a perspective view of part of a clamping mechanism which also comprises a bearing support for a side kick bar, and Fig. 7 shows a modified form of clamping means for the stand mechanism.

My bicycle stand mechanism comprises an adjustable support or stand, swingable to a supporting position and to an inactive position, the latter position being substantially parallel with one of the rear wheel support reaches or fork bars of the bicycle frame. A supporting member 8, comprising a unitary structure having axial connection with a bracket mechanism attachable to the lower rear fork members of the bicycle frame adjacent the crank hanger housing of the bicycle frame, as shown in Fig. 1, is preferably formed from a solid bar. The arrangement is such that the support member 8, when swung to an inoperative position, will not interfere with the riding of the bicycle, and when swung upwardly will lie beneath one of the lower rear fork members of the frame. Thus, in Fig. 2, 9 designates the crank hanger housing of the bicycle frame, and 10 and 11 portions of the lower rear wheel fork members of the bicycle frame.

As shown in Fig. 1, the bicycle support 8 or stand proper is provided with an outwardly bent end 13, for engagement with the pavement or other supporting surface. The upper end of the support member 8 is bent to an obtuse angle relative to the main portion of the support to provide a bracket-engaging portion and also part of support-positioning mechanism which will now be described.

The attaching bracket and support-positioning means comprises a bracket member 16, preferably formed of pressed metal having end portions 17 and 18 bent upwardly normal to the body of the bracket plate 16, the portions 17 and 18 having the marginal edges thereof shaped to engage the inner undersides of the frame fork members 10 and 11. I provide a clamping plate 20, shaped, as shown in Fig. 2, to rest upon the upper portions of the fork members 10 and 11, and bolt members 21 and 22, extending through the top plate 20 and the bracket plate 16. These bolt members serve to hold the members 16 and 20 in clamped relation to the fork members 10 and 11 adjacent the crank hanger housing 9.

A bearing for the horizontally extending portion 14 of the fork member 8 is provided by forming the bracket member 16, as shown in Fig. 6, with struck-up U-shaped portions 24 and 25 and an enlarged centrally disposed struck-up portion 26, which is shaped to receive and house an offset or crank portion 28. It will be apparent from the showing in Figs. 2 and 6 that the bearing portions 24 and 25 are formed on the bottom bracket member 16 in alignment along a line which is at an angle to a vertical plane passing through the bicycle frame, whereby, when the fork member 8 is swung upwardly to inactive position, the same may be brought into juxtaposition with the underside of the lower fork member 11 of the bicycle frame.

To definitely hold the support member 8 in either its bicycle-supporting position, as shown in Fig. 1, or in its inactive position, as shown by the dot and dash lines in Figs. 1 and 5, I provide a hollow spring-urged plunger 30 within a depending cup-shaped member 31, attached to the bracket member 16. Between the two members 30 and 31 is a coil spring 32. The cup-shaped member 31 is provided with lugs 33 which may be riveted or otherwise secured to the lower bracket member 16, whereby the upper flat end 30a of the plunger member 30 will be urged into engagement with either one of the lands or flat surfaces 34 or 35, formed on the crank portion 28 of the support member 8. The member 31 is also formed as a bearing cap to close the U-bearing portions of the member 16 when the mechanism is assembled.

In Figs. 3 and 5 the support member 8 is shown in its bicycle-supporting position, with the plunger member 30 in engagement with the surface 34, and when the support 8 is swung to inactive position the plunger 30 engages the flat surface 35, as indicated by the dot and dash lines in Fig. 5.

If desired, a bumper member 36, in the form of rubber tubing or other suitable material may be secured to the support member 8 to protect the fork member 11 when the support member is swung to inactive position.

In the modified form of my invention, shown in Fig. 7, but one bolt 40 is provided. This bolt may be a carriage bolt with the square shank 41 thereof fitting into a square opening formed in the lower plate member 16, in alignment with the axis of the pivoted portion of the stand bar 8, whereby the bolt head 43 will be disposed immediately above the offset or crank portion of the stand bar without interfering with the operation thereof. The usual nut 44 and lock washer 45 serve to clamp the top plate 46 of this construction to the top surfaces of the fork bars 10 and 11.

The operation of the mechanism is as follows: Assuming the stand bar 8 to be in the inoperative position shown by the dot and dash lines of Figs. 1 and 4, the bar is maintained in this position by the action of spring 32 and plunger end 30a acting on the land 35 of crank portion 28 of the stand bar. When desired to shift the stand bar to bicycle-supporting position, the bar may be swung with foot or hand to the full line position shown in Fig. 1, thus causing the plunger 30 to be forced downwardly against the spring by the turning action of crank portion 28 until the crank portion abuts the inner face of the housing wall and the spring in the last part of the swing of the bar will force the plunger face 30a upwardly against the land 34. It will be noted that the lands or flat surfaces 34 and 35 are formed on the crank portion 28 at angles relative to a center line passing through the crank portion, as viewed in Fig. 4, which are equal and the sum of which equal the total swinging angle of the stand bar 8.

It will be apparent that the foregoing described means for holding the support member in a desired position can be compactly and sturdily made in such manner as to not require much attaching space and the positioning means can be completely housed to prevent accumulation of foreign matter, should the apparatus be lubricated.

I claim:

1. In a bicycle stand mechanism adaptable for attachment to the lower rear fork members of a bicycle frame, the combination of a bracket mechanism including an upper clamping plate and a lower clamping plate adapted to be bolted to the upper clamping plate with the lower rear wheel fork reaches of the frame disposed between the clamping members, said lower clamping plate comprising a housing structure having U-shaped pivotal bearing portions for pivotally supporting a bicycle frame stand member, a stand member pivotally mounted in said U-portions, said stand member having a crank offset portion integrally formed thereon to lie between said bearing portions and a spring-urged plunger mechanism mounted upon and depending from said lower clamping plate, the plunger mechanism being positioned to act upon said offset crank portion of the stand member to maintain the stand member in either one of two adjusted positions.

2. In a bicycle stand mechanism adaptable for attachment to the lower rear fork bars of a bicycle frame, comprising a bracket mechanism including an upper clamping plate and a lower clamping plate adapted to be bolted to the upper clamping plate with the lower rear wheel fork bars of the frame disposed between the clamping members, said lower clamping plate having U-shaped bearing portions formed at the sides thereof and a housing structure adapted to be disposed between said fork bars, a stand bar having an end portion mounted in said bearings, the stand member having a crank offset integrally formed thereon and disposed between said bearing portions and within the housing structure of the plate member, and a plunger mechanism mounted upon and depending from said lower clamping plate, the plunger mechanism being positioned to act upon said offset crank portion of the stand member and said plunger mechanism being carried by a housing structure secured to said lower clamping plate and said crank portion of the stand bar having lands or faces formed thereon angularly relative to a center line passing through the crank portion and through the axis of the bar pivot.

HERMAN L. KRAEFT.